Figure 1:
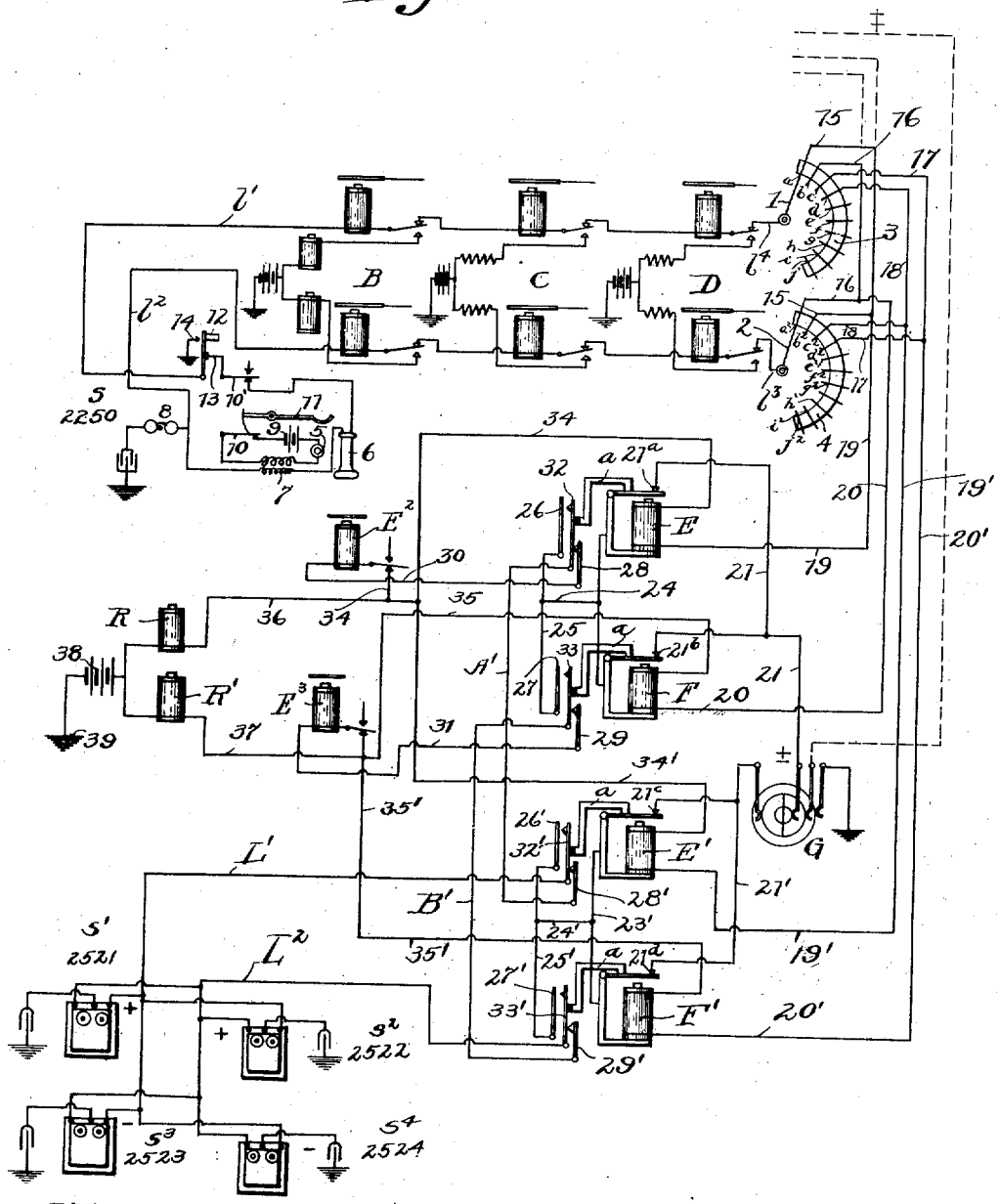

W. R. BINKLEY.

AUTOMATIC ELECTRIC EXCHANGE SYSTEM.

APPLICATION FILED DEC. 16, 1904.

Reissued Sept. 22, 1914.

13,802.

5 SHEETS—SHEET 1.

Witnesses:

Arthur H. Boettcher

Leonard W. Novander

Inventor

William R. Binkley

By Charles A. Brown

Attorney.

W. R. BINKLEY.

AUTOMATIC ELECTRIC EXCHANGE SYSTEM.

APPLICATION FILED DEC. 16, 1904.

Reissued Sept. 22, 1914.

13,802.

5 SHEETS—SHEET 2.

Witnesses:

Leonard W. Novacek.

Charles J. Schmidt.

Inventor

William R. Binkley

By Charles A. Brown

Attorney

W. R. BINKLEY.

AUTOMATIC ELECTRIC EXCHANGE SYSTEM.

APPLICATION FILED DEC. 16, 1904.

Reissued Sept. 22, 1914.

13,802.

5 SHEETS—SHEET 3.

Witnesses:

Leonard W. Novander.

Charles J. Schmidt

Inventor

William R. Binkley

By Charles A. Brown

Attorney

W. R. BINKLEY.

AUTOMATIC ELECTRIC EXCHANGE SYSTEM.

APPLICATION FILED DEC. 16, 1904.

Reissued Sept. 22, 1914.

13,802.

5 SHEETS—SHEET 4.

Witnesses:

Arthur H. Boettcher,

Leonard W. Novander

Inventor

William R. Binkley

By Charles A. Brown

Attorney.

W. R. BINKLEY.

AUTOMATIC ELECTRIC EXCHANGE SYSTEM.

APPLICATION FILED DEC. 16, 1904.

Reissued Sept. 22, 1914.

13,802.

5 SHEETS—SHEET 5.

Witnesses:

Arthur H. Boettcher

Leonard W. Novander.

Inventor

William R. Binkley

By Charles A. Brown

Attorney.

UNITED STATES PATENT OFFICE.

WILLIAM RAGAN BINKLEY, OF NEW BEDFORD, MASSACHUSETTS, ASSIGNOR, BY MESNE ASSIGNMENTS, TO WESTERN ELECTRIC COMPANY, OF CHICAGO, ILLINOIS, A CORPORATION OF ILLINOIS.

AUTOMATIC ELECTRIC EXCHANGE SYSTEM.

13,802. Specification of Reissued Letters Patent. Reissued Sept. 22, 1914.

Original No. 717,327, dated December 30, 1902, Serial No. 115,498. Application for reissue filed December 16, 1904. Serial No. 237,188.

*To all whom it may concern:*

Be it known that I, WILLIAM RAGAN BINKLEY, a citizen of the United States, residing at New Bedford, in the county of Bristol and State of Massachusetts, have invented certain new and useful Improvements in Automatic Electric Exchange Systems; and I do declare the following to be a full, clear, and exact description of the invention, such as will enable others skilled in the art to which it appertains to make and use the same.

My invention relates to certain improvements in electrical exchange systems of that character wherein all the switching of the subscribers' telephone-circuits is performed automatically and electrically by the action of the subscriber at his own station in manipulating a key or other translative device which, through intermediate connections, electrically operates exchange mechanism at a central office; and the present invention is designed for use in connection with the well-known "Strowger system" and is applicable to existing plants without change in the calling devices and without imposing any other labor, care or thought on the part of the operating subscriber than is now required. I do not wish to limit the application of my system, however, to the "Strowger system", but it may be applied with equal advantage to other automatic systems.

The object of my invention is to provide means whereby any subscriber may selectively connect himself with any of the subscribers connected with a party line without imposing any additional operations upon the subscriber other than those heretofore used in the "Strowger system", for instance. In this automatic system two banks of contacts are provided with which the subscriber's line may be connected, pairs of contacts being connected with the individual lines leading to substations, and upon actuation of contact arms or wipers upon manipulation of the subscribers' apparatus, the particular line desired is automatically connected with the subscriber, and upon actuation of the calling key the called subscriber is signaled. Any subscriber can thus only connect himself with the one subscriber on any line.

My invention provides means for allowing each subscriber to selectively connect himself with any of the party subscribers on a single line, and the invention in its broadest sense consists in supplying each party line with a number of sets of contacts rather than with one set, or a number of paths rather than one path, by which any selective switch having access to that line may make connection with the line, the arrangement being such that the selection of the path for the set of contacts, through which connection is to be established with the line, at once determines the station at that line that is to be signaled, and upon actuation of the substation ringing key, that station desired will be signaled and no other, and to accomplish this no other operations are necessary by the subscriber other than those used on single subscriber line systems. In conjunction with this improved arrangement of contacts, I provide an arrangement of controlling relays in pairs connected with dissimilar points of the two banks of contacts, with which the subscribers may be connected in such manner as to produce the selective results above described. In the "Strowger" and other systems the last number actuated on the selective mechanism determines the line to which the desired subscriber is connected, while with my improved arrangement and additions, the actuation of the last number of the selective mechanism besides connecting the calling subscriber with the line of the called subscriber also simultaneously selects the called subscriber from a number of party subscribers, all connected to the same line, and, upon actuation in the ordinary manner of the ringing key, suitable current will be sent from the central station to call the particular subscriber desired and no other of the party subscribers.

My invention which also includes other novel features of construction and combination and arrangement of parts will be better understood by reference to the accompanying drawings, in which—

Figure 2:
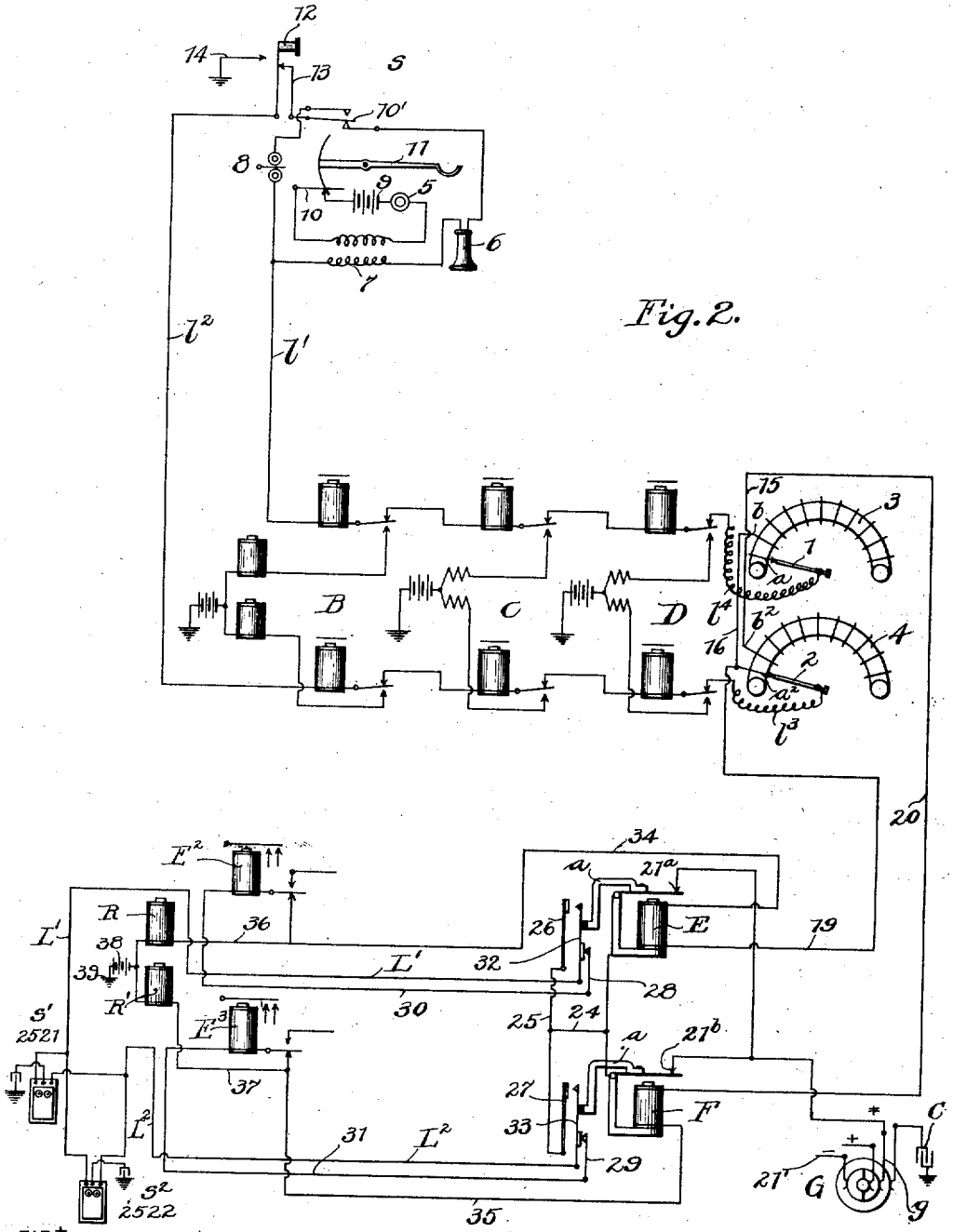
Figure 3:
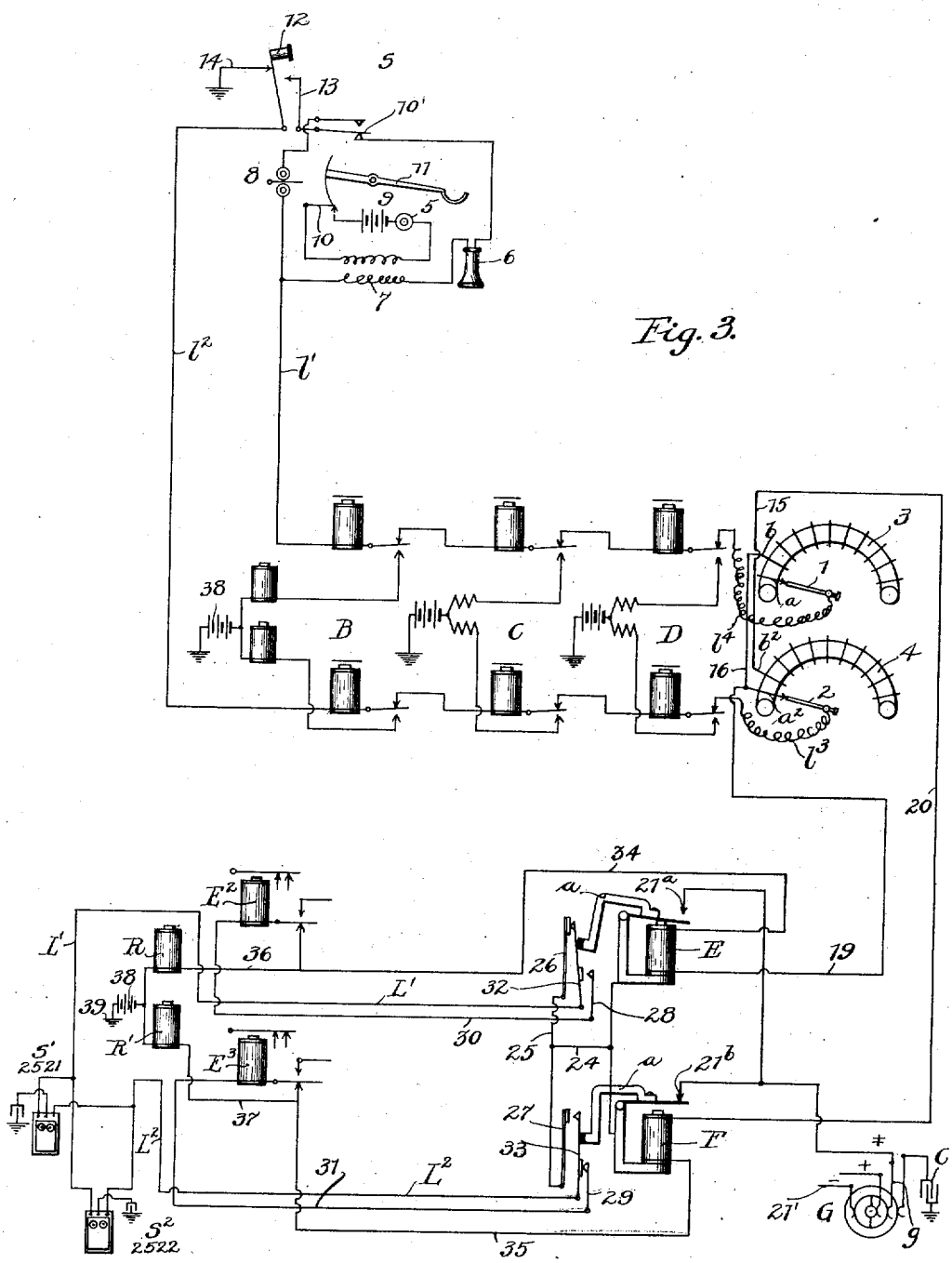
Figure 4:
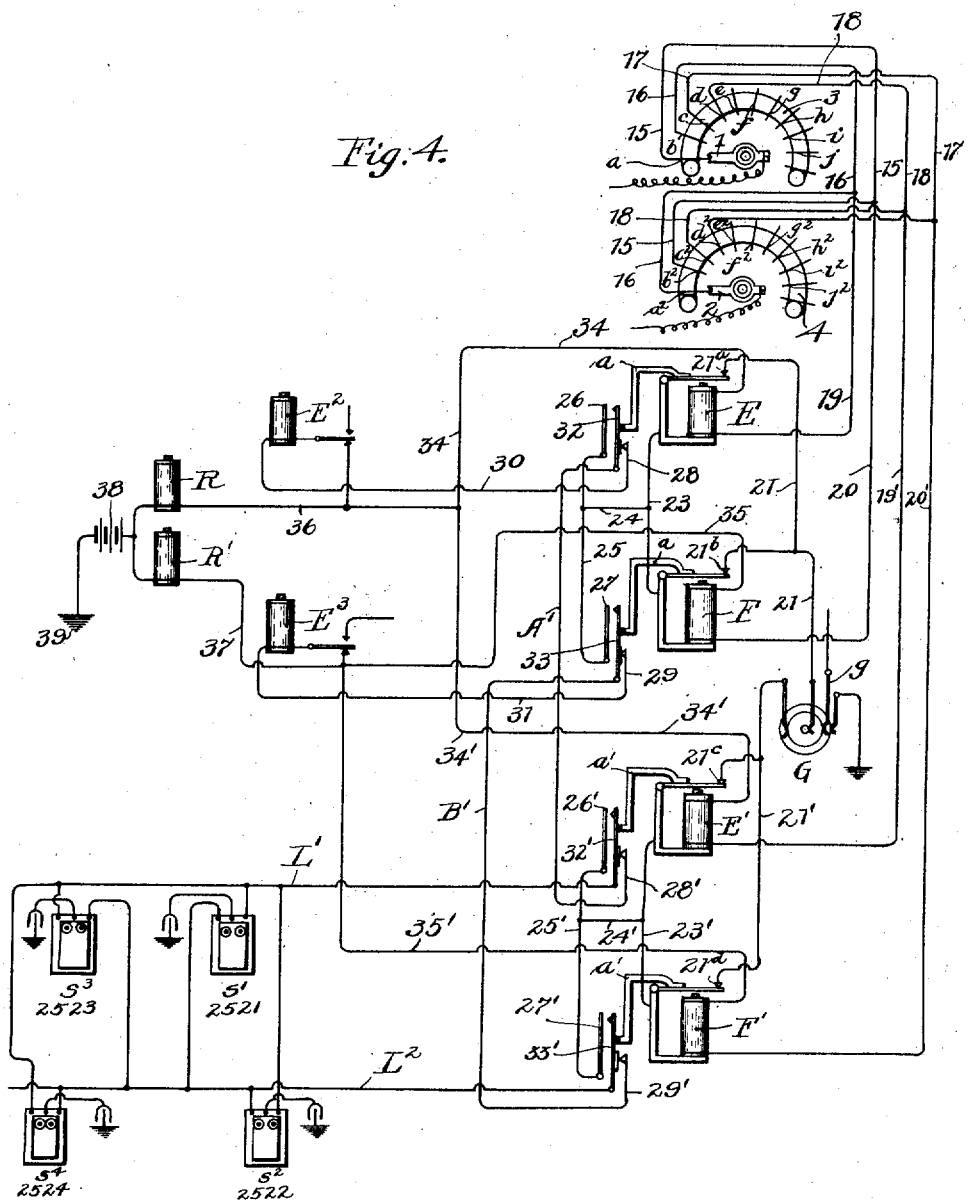
Figure 5:
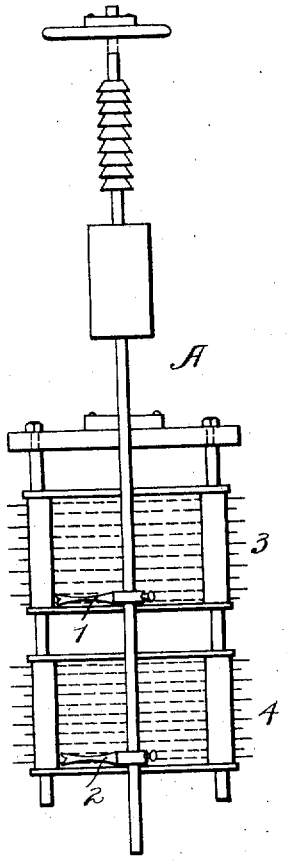
Figure 6:
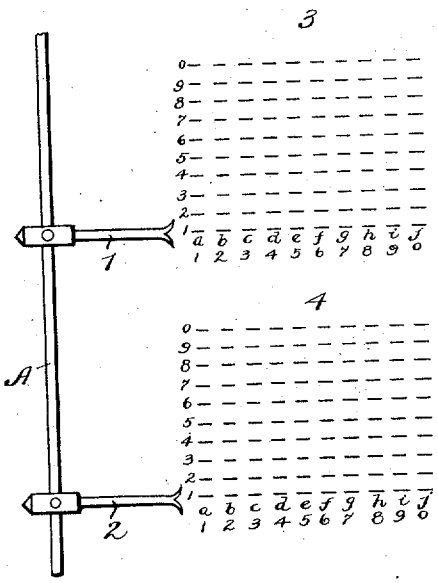

Figure 1 is a diagrammatic view of a party-line-telephone system embodying my invention, showing one of the subscribers' stations connected up with the exchange mechanism and another station. In this view the main shaft, banks of contacts, etc., are distorted from their natural positions to more clearly illustrate the operation. Fig. 2 is a similar view, on an enlarged scale, of three of the stations and the switch or exchange mechanism, showing the circuits and ringing-relays for a two-party line. Fig. 3 is a similar view showing one of the ringing-relays actuated to impress a ringing-current on the line. Fig. 4 is a diagrammatic view showing the arrangement in a four-party line. Figs. 5 and 6 are detail views of the wiper-operating devices and the wipers with the coöperating banks of contacts.

Referring now more particularly to the drawings, A designates the main operating shaft, which carries the spring-wipers 1 and 2 and which is designed to be slidably and revolubly mounted in the usual way. This shaft may be operated by any ordinary type of feed mechanism—such, for instance, as that employed in exchanges of the Strowger type or any other feed mechanism which may be found suitable for the purpose. I have merely shown the shaft and coöperating switch mechanism at the central office conventionally and have omitted the calling or translating devices at the subscribers' stations by means of which the said switch mechanism is operated, as these devices are all well known to those versed in the art and require no detailed illustration or description.

The wipers 1 and 2 are adapted to engage the contacts of the banks or series 3 and 4, which contacts are arranged in each bank in two different lines or rows, the vertical rows in Fig. 6 representing units and the horizontal rows tens. To these contacts are connected the normal wires leading to the individual or first selector-switch, which is the subscriber's switch, thence to the line-wires leading from and to the telephone-stations. The mode of operation of the wipers in connecting any one telephone-station with any other station in the system through the operation of the shaft is well understood by those versed in the art.

In the ordinary Strowger system but one pair of contacts in any connector is used to enable the talking circuit to be continued from a calling to a called line, but in my arrangement I provide each connector with a number of sets of contacts rather than one set, or a number of paths rather than one path; by which any selecting switch having access to that line may make connection with the line to connect the substation therewith, and I modify the usual construction by uniting or bridging contact points or normals of one bank with the dissimilar points or normals of corresponding positions in the other bank, as will be more fully explained hereafter.

$S'$, $S^2$, $S^3$, and $S^4$ represent telephone-stations arranged in the system, and $L'$ $L^2$ the line-wires. Each telephone station includes the ordinary devices embodied in telephone systems of the automatic exchange party-line type, the same consisting of a transmitter 5, receiver 6, induction coil 7, a bell 8, having the usual ground connection through a condenser when a party line, and a local battery 9, connected by suitable circuit wires, together with switches 10 10′ for throwing the bell and talking devices into and out of circuit of the line, a telephone hook 11, which alternately closes said switches, and a switch key 12, movable between the line contact 13 and grounded contact 14 for transmitting electric impulses to operate the mechanism at the central office which controls the action of the ringing relays.

B, C, and D represent, respectively, the first or thousands selector-switch, the second or hundreds selector-switch, and a third selector-switch which may be the connector for all numbers in between, say 2,499 and 2,601. These switches are connected up in the ordinary manner with the line wires at the central office.

In carrying my invention into practice I connect or bridge the contact points of the two banks or rows 3 and 4, so that dissimilar points of these two banks when united and taken in pairs are connected to pairs of normal wires which lead to outgoing lines through the subscriber's or first selector-switch, and I also connect said points to ringing relays E and F, E′ and F′, it being observed that as a matter of illustration the points *a b c d* of bank 3 are respectively connected to the dissimilar contact points $b^2$ $a^2$ $d^2$ $c^2$ of bank 4 by the wires 15, 16, 17, and 18, the pairs of contacts thus connected being in turn connected to the magnets of the relays by the wires 19 20 and 19′ 20′. As shown, the relays are operated in pairs, having only their external or ringing circuits interconnected, so that each will open up the lines $L'$ $L^2$ and impress the ringing current on the outside line, which will be traced out hereinafter.

Located at the central office is a motor generator G which may be capable of supplying currents of different character, being herein shown as adapted for supplying positive and negative pulsating currents or an alternating current to the several controlling relays, one terminal of the generator G being grounded. In some cases, especially where pulsating current is used for selecting, it might be well to insert a condenser C in the ground lead from the generator G to prevent flow of direct current which might undesirably influence other apparatus. The two relays E and F are connected by a conductor 23, which is connected by a bridge wire 24 with another conductor 25, having contacts 26 and 27. These contacts are arranged in juxtaposition to other contacts 28 and 29, connected to conductors 30 and 31, leading, respectively, to relays $E^2$ and $E^3$, and between the two contacts 26 and 28 plays a switch 32, while between the two contacts 27 and 29 plays a switch 33, which switches are respectively connected to the line wires L′ and $L^2$ through conductors A′ and B′, which lead respectively, to the contacts 28′ and 29′, engaging the corresponding switches 32′ 33′ of the relays E′ F′, which switches 32′ 33′ are in direct connection with said line wires L′ $L^2$. The magnets of the relays E and F have leading therefrom wires 34 and 35, which connect the same with the relays $E^2$ $E^3$, and from said wires lead branches 36 and 37, which connect the relays with retard-coils R R′ which coils R R′ are connected with each other and with a battery 38 and ground-tap 39. The switches 32 and 33 are of spring metal and normally retained in engagement with the contacts 28 and 29 by their resiliency. They are pressed into engagement with the contacts 26 and 27 by the arms *a*, projecting from the relay armatures, when the relay magnets are energized and the free ends of the armatures are drawn down, as hereinafter described. The relays E′ and F′ are connected up in the ringing circuit in like manner, the parts coöperating therewith and corresponding to those before described in connection with relays E and F, being designated by similar primed reference numerals or characters. The system of wiring necessarily differs in detail in telephone systems in which the subscribers are differently grouped or arranged; but the principle of arranging the ringing relays in pairs and in series with the normal wires leading from the connector switch to the subscriber's switch will in each case remain the same.

As an illustration of the operation of my invention, I have represented station S′ (2,521) as having been called from station S. Examination of Fig. 1 will show that four pairs of contacts on the connector may be used to connect the substation S with the party line to which is connected the party substation S′. In other words, the party line may be reached by moving the contacts or wipers 1 and 2 into engagement respectively with contacts *a* and $a^2$, or it may also be reached by moving them into engagement with contacts *b* and $b^2$, and so on throughout four pairs of contacts. This provision of a plurality of waiting or stationary contacts on the connector for each line is for the purpose of having the choice of waiting contacts, through which connection is made with the line, determine at once what party station on the line shall be signaled. To make this clear it will be noticed that the four stations on the called party line are 2521, 2522, 2523, 2524. This means that the connector used must be one that is serving a group of subscribers whose numbers begin with 2500. After having accounted for the first three digits, that is 252, by actuation of the ordinary selective mechanism (not shown), it is evident that the same line will be engaged through the wipers and contacts whether the final digit actuated is 1, 2, 3, or 4. Therefore, as far as connecting with the line is concerned, and completing the talking circuit, it makes no difference which of these four numbers is sent. For instance, if the contacts *a* and $a^2$ are engaged by the wipers the talking circuit may be traced as follows: from the receiver 6 at substation S through line limb $l^2$ through the relays B, C and D to conductor $l^3$, wiper 2, contact $a^2$, conductor 16, conductor 20, relay F, relay $E^3$, conductor 31, contact 29, contact 33, conductor B′, contact 29′, contact 33′, line limb $L^2$ through one of the party substations back to the line limb L′, contact 32′, contact 28′, contact 32, contact 28, relay $E^2$, conductor 34, relay E, conductor 19, conductor 15, connector contact *a*, wiper 1, and through line limb *l′* back to receiver 6. If any of the other connector pairs *b*, $b^2$, *c*, $c^2$, or *d*, $d^2$ be used, the substation S will be connected with the party line substation over the same circuit just traced. The pair of contacts engaged, however, determines which of the party line substations will be signaled. If the party line is reached through the first pair of contacts, *a* and $a^2$, and the ringing key 12 at the calling substation S be actuated, the relay E will be operated and the generator G will be connected with the party line in such manner as to ring the bell only at the substation desired, in this case, substation 2521. Similarly the reaching of the line through any of the other contacts at the connector will determine the action of a different ringing relay and therefore will determine the application of the ringing current to the line to ring only the corresponding bell. Thus the selection of any one of the four contacts on the connector determines the party line that the calling substation is to be connected with, and the selection of the particular contact pair determines how the ringing mechanism shall be operated to select from the party stations connected with the party line the particular station desired.

Figs. 2 and 3 show a two party line, and in signaling S′ from S the calling subscriber at S presses signal switch 12 against ground tap 14 to establish the following circuit: from ground by way of 14 to switch 12, thence to switches B, C and D, conductor 13, wiper 2, bank contact $a^2$, conductor 16, conductor 19, relay E, conductor 34, retard coil R, and battery 38 to ground. Relay E thus becomes energized, and as shown in Fig. 3, its armature upon attraction is disconnected from the contact $21^a$ which breaks the connection of the armature with the conductor 21 and with the generator G. Actuation of this armature also causes contact 32 to be disengaged from contact 28 and to be engaged with contact 26. Current from generator G can now flow only as follows: from the generator G through conductor 21 to contact $21^b$ to the armature of relay F, through conductors 23 and 24, through contacts 26 and 32, to line limb L′ through the selected substation 2521 to ground thus signaling the subscriber S′. Had station $S^2$ or 2,522 been called, the wipers 1 and 2 would rest on bank contacts $b$ $b^2$, and by reason of the bridging of the dissimilar points $b$ with $a^2$ and $a$ with $b^2$ a reversal of the circuit would have been effected, so that $l^2$ would be connected with conductor 20 and relay F, and the same operation of switch 12 would actuate relay F, impressing upon line $L^2$ a ringing current in precisely the same manner, except that the armature of said relay would break contact with $21^b$. In like manner, referring to Figs. 1 and 4, which represent a four party line, and tracing the circuits from $c$ $d^2$ and $d$ $c^2$, which corresponds to numbers 2,523 and 2,524, (stations $S^3$ and $S^4$), relays E′ and F′ are operated the same as E and F, but send a ringing current of opposite polarity along lines L′ and $L^2$.

It will be understood that relays $E^2$ and $E^3$ are the line relays of the individual or subscriber's switch, which in the present instance is the switch of the called subscriber. They perform no part in the selective ringing system and are shown in the present specific illustration only because they are in the circuits at all times. Their function is to close the circuit of the local battery through the operating switch magnets in calling or making connection with a station.

The release or disconnection of the calling from the called subscriber is effected in the Strowger system by grounding both lines simultaneously on hanging up the receiver of the calling station, which will operate both ringing relays simultaneously. This simultaneous action of the pair of relays cuts off the generator, which would otherwise impress ringing current on both lines, sending false signals to the subscribers. It is recognized that the relays may be designed in different forms to accomplish the same results; but in each case they must be dependent upon each other for supplying the ringing currents to the subscribers' lines.

In calling from station S′ or station $S^2$ the circuits are the same as when calling from station S, with the exception of the introduction of the spring contacts 32—28 and 33—29 in the line wires where they enter the individual switch. Referring, for example, to Fig. 2, let it be supposed that station S′ desires to call some other station. The circuits from S′ will then be over L′ to contact spring 32 to 28, thence by 30 to line relay $E^2$ to 36, to retard coil R, and battery 38 to ground at 39, thus placing it within the power of the person at S′, through the usual calling device, to operate line relay $E^2$. The circuit from $L^2$ would be by spring 33 to 29, to wire 31, to line relay $E^3$, to 37, to retard coil R′, and battery 38 to ground, thus placing relay $E^3$ under control of the operator through the usual calling device. The operation in this connection will thus be made clear. It is to be understood that relays E and F are not affected by currents from stations S′ and $S^2$ when these stations are calling or making a telephone connection with any other station; otherwise the system would be rendered inoperative. Said relays are in the normal wires which terminate in the bank contact of the connector switch, and when not engaged by said connector switch—that is, when station S′ and $S^2$ are not being called by some third station—the said normals are on open circuit, and consequently cannot be affected by currents from station S′ or $S^2$, as it is intended they should not be. By thus providing for the automatic operation of the signal the system is rendered more desirable, and at the same time by using two series relays of about thirty-five ohms resistance each I am enable to dispense with the one-thousand-ohms bridge and one-thousand-ohms resistance commonly used.

I thus provide very simple and efficient means whereby in calling the several different numbers representing the several different stations of a party line, one of a number of ringing relays may be automatically selected which will impress upon the party line a current of such strength and polarity as to ring the bell at the station only of the subscriber whose number has been called, and this is done automatically during the ordinary selective procedure used on the Strowger or other systems. Many arrangements also of relays may be employed with the arrangement of contact banks described, so long as the relays are actuated to allow the proper current flow from the generator over but one line limb to signal the desired party line subscriber. I do not therefore wish to be restricted to the exact form and arrangement shown, as many changes therein or variations therefrom might suggest themselves, all of which would be clearly included within the spirit and scope of the invention.

Having thus described my invention, what I claim as new and desire to secure as Letters Patent, is:

1. In an automatic telephone exchange system, a pair of telephone lines, a calling station on one line, a plurality of stations on another line to be called, a central station with automatic switching means thereat under the control of the calling station for establishing conversational connections between said stations, said automatic switching means serving also to establish connections for selectively signaling any one of the stations on the desired line.

2. In an automatic telephone exchange system, the combination with a calling and a called telephone line each extending from a subscriber's station to a central station, of connector mechanism associated with each line, a plurality of pairs of conductors leading from each connector mechanism to the associated line, and means at the calling substation for controlling the actuation of the associated connector mechanism to establish connection between said lines over a predetermined pair of said conductors.

3. In an automatic selective signaling system, the combination with a plurality of lines leading from substations to a central station, of connector mechanism adapted upon actuation automatically to connect a calling line with a called line, means located at the calling substation for controlling the associated connecting mechanism, a plurality of interconnecting signaling branches associated with each line, and means for establishing connection from a substation on a calling line to a called line through a desired one of the branches connected therewith.

4. In a party line signaling system, the combination with automatic exchange mechanism, of a plurality of line circuits leading to and from the exchange, a plurality of interconnecting signaling paths over which a circuit may be completed between two of said line circuits, and means actuated from a substation on one of such line circuits for completing such connection over a desired one of such paths.

5. In an automatic exchange system, the combination with a plurality of party lines each leading from a plurality of substations to a central station, of connector mechanism associated with each line at the central station, means at each of the substations for controlling the actuation of the connector mechanism of the line leading thereto and serving upon actuation to connect a calling line with a called line, a plurality of interconnecting paths available to each connector mechanism for establishing connection between a calling line and a called line, a source of signaling current, selective mechanism controlling the current flow from said source, and means for automatically connecting the source of signaling current through the selected path with the called line.

6. In an automatic telephone exchange system, the combination with a plurality of party lines extending from a central exchange and each terminating in a plurality of party line substations, of a connector at the central exchange, means for automatically controlling the connector to connect electrically the calling line with the called line, mechanism located at the substations for controlling the operation of said means, a ringing circuit, ringing mechanism at the exchange, a key at the calling substation for controlling the ringing circuit, and means serving to connect the calling line with the called line and simultaneously to cause the proper arrangement of the ringing mechanism whereby the actuation of the controlling key causes the selective signaling of the desired station on the called line.

7. In an automatic telephone exchange system, the combination with a central exchange, of a calling line and a called line leading therefrom, connector mechanism at the central exchange, said connector mechanism having contacts connected through a plurality of paths with the calling line, switch arms for said connector mechanism adapted upon actuation of suitable calling substation apparatus to engage said contacts to select one of said paths through which the calling line is electrically connected with the called line, a plurality of selective signaling devices connected with the called line, a source of selective calling currents, and means controlled from the calling substation for operatively closing the circuit between the called line and the source of signaling currents over the selected path.

8. In an automatic telephone exchange system, the combination with a plurality of telephone lines, of a plurality of stations on each of said lines, each station being equipped with a selectively responsive signal receiving device, connector mechanism for each line, means located at each substation for controlling the operation of the associated connector mechanism at the central station, a plurality of paths associated with said connector mechanism through any one of which connection may be established through a calling line and a called line, and means for automatically establishing connection between a calling line and a called line upon the actuation of the connector mechanism of the calling line.

9. In an automatic exchange system for party-line telephones, exchange mechanism for connecting the stations, a motor generator, ringing relays connected in pairs, circuit connections between the exchange mechanism, generator and relays, means for energizing the magnet of one of the relays of a pair, a switch operated by the armature of the energized magnet to throw the generator into and out of circuit of the line through the armature and circuit connections of the other magnet to transmit a current impulse to operate a signal at a called station, and means for restoring the parts to their normal positions, substantially as set forth.

10. In an automatic exchange system for party line telephone systems, exchange mechanism embodying banks of contacts having dissimilar points connected, a motor generator, ringing relays connected in pairs, circuit connections between the contacts and different sets of relays, circuit connections between the line, generator and relays, and switch mechanism controllable from a substation and through the armatures and circuit connections of the relays to throw the generator into and out of circuit of the line to transmit a current to operate the signal at a called station, substantially as and for the purposes set forth.

11. In an automatic exchange system for party line telephone systems, exchange mechanism embodying banks of contacts having dissimilar points connected, a motor generator, ringing relays connected in pairs, circuit connections between the contacts and different sets of relays, circuit connections between the line, generator and relays, means for energizing the magnet of one of the relays of a pair, a switch operated by the armature of the energized magnet to throw the generator into and out of circuit of the line through the armature and circuit connections of the other magnet to transmit a current impulse to operate a signal at a called station, and means for restoring the parts to their normal positions, substantially as and for the purpose specified.

12. In a system of the character described, banks of contacts having dissimilar points connected, a motor generator, a pair of connected ringing relays whose armatures are normally in circuit with the generator but out of circuit with the line, said relays being electrically connected with said contacts, switch mechanism for connecting the relays with the line, and means for operating one of the relays to close said switch mechanism and connect said relay with the line and disconnect it from the generator, whereby a circuit from the generator to the line is established through the armatures and circuit connections of the connected relays, substantially as set forth.

13. In a telephone exchange system, the combination with a central station, a plurality of party lines, each leading from said central station to a series of substations, selective signaling apparatus at each substation, selective signaling apparatus at the central station adapted to coöperate therewith, electromagnetic connector mechanism at the central station, switching apparatus at each of the substations adapted to control the operation of said connector mechanism for connecting a calling line with the called line, and a plurality of paths at the central station through any one of which the connector mechanism may connect a calling line with the called line.

14. In an automatic telephone exchange system, the combination with a central station, of a called telephone line leading therefrom to a plurality of substations, signaling apparatus at each of said substations, selective signaling apparatus at the central station for actuating said substation signaling apparatus selectively, automatic connector mechanism at the central station adapted upon actuation to connect a calling line with the called line, a calling line leading from the central station to a substation, switching mechanism located at the substation on the calling line for actuating said automatic connector mechanism at the central station, and a plurality of paths at the central station through any one of which the connector mechanism may connect a calling line with the called line.

15. In an automatic telephone system, a plurality of telephone lines terminating by their limbs at a central office, connecting mechanism at such central office adapted to be operated from substations on such telephone lines to connect two of such lines for conversation, a plurality of signaling paths connected with one of such telephone lines, and means operated from a substation on a second line for including a predetermined one of such paths in circuit with such second line.

16. In an automatic telephone system, a plurality of telephone lines terminating by their limbs at a central office, connecting mechanism at such central office adapted to be operated from substations on such telephone lines to connect two of such lines for conversation, a plurality of signaling paths connected with each of such telephone lines, and means operated from a substation on one of such telephone lines for including a predetermined one of such paths in circuit with such telephone line.

17. In a telephone exchange system, in combination, a calling line, a line to be called, a plurality of telephone stations connected with the line to be called, a central station, automatic connecting mechanism at the central station, a plurality of conducting paths leading from the calling line to the line to be called, means associated with the different conducting paths for individually signaling the different stations on the line to be called, and means at the calling station for operating such connecting mechanism to establish connection between the calling and the called lines over an elected one of such conducting paths, whereby an elected station on the called telephone line will be signaled.

18. In an automatic telephone exchange system, a party line, another line, a calling station thereon, a central station for connecting said lines for conversation, and automatic means thereat for completing connections between the calling and the called lines and means under the control of the calling station for selectively signaling any party on the party line.

19. In an automatic telephone exchange system, a party line, a second line, a calling station thereon, interrupter means at the calling station, a central station and connector means thereat controlled by said interrupter, and automatic means for connecting the calling station with the desired line and selecting the desired party on said line.

20. In a telephone exchange system, a calling and a called subscriber's line, a plurality of telephones on the called subscriber's line, a signal at each station thereon, means at the central office for interconnecting said lines for conversation, automatic switching mechanism at the central office and means at the calling subscriber's station to control said automatic switching mechanism over the telephone line for completing circuits for selectively sounding any signal on said called line.

21. In an automatic telephone exchange system, a calling station, a plurality of stations on a party line, automatic apparatus at the central office, control apparatus at the calling station, said control apparatus being adapted to be actuated in a plurality of different ways to cause the automatic apparatus to connect said calling station and said party line, and selective signaling apparatus corresponding with the different ways of operating said control apparatus adapted to selectively signal a different one of the parties on said party line.

22. In an automatic telephone exchange system, a calling line, a calling station thereon, a calling device at the calling station, a party line, bells at the various stations thereon and means controlled over the line conductors from the calling station by the selective operation of said calling device for completing a connection for the selective operation of the bells on said party line.

23. In a telephone system the combination with a central station, of a distant calling subscriber's station connected by line wires with the central station, a plurality of other distant stations connected by a pair of line wires with the central station, a link circuit at the central office for connecting the line wires of the calling station with the line wires of the other stations, and means under the control of a subscriber at the calling station for selectively signaling any one of the other stations.

24. In an automatic telephone exchange system, the combination with automatic switching mechanism, of a calling device, a party line to be called, a plurality of annunciators thereon, a plurality of paths between said device and the line to be called for completing the connection, any one of which paths may be elected and selected from the calling device, and apparatus associated with said paths adapted to connect signaling current with said line for selectively sounding said annunciators.

25. In an automatic telephone exchange system, the combination with automatic switching mechanism, of a calling device, a party line to be called, a plurality of annunciators thereon, a plurality of paths between said device and the line to be called for completing the connection, any one of which paths may be elected and selected from the calling device, and apparatus associated with said paths adapted to connect signaling current with said line for sounding the annunciator at the desired station and excluding the other annunciators on said line.

26. In an automatic telephone exchange system, the combination with automatic switching mechanism, of a calling device, a party line to be called, a plurality of signals for said line, a plurality of paths between said device and the line to be called for completing the connection, any one of which paths may be elected and selected from the calling device, and relays associated with said paths adapted to connect signaling current with said line for selectively sounding the desired signal.

27. A telephone system comprising substation party lines, automatic apparatus controlled at a calling substation for extending the circuit thereof to a called party line, and means controlled from the calling substation for selectively signaling the desired substatioin of the called line.

In testimony whereof I have hereunto set my hand in presence of two subscribing witnesses this 9th day of December, A. D. 1904.

WILLIAM RAGAN BINKLEY.

Witnesses:

ROBERT C. ALLEN,
EDWARD M. SLOCUM.

Copies of this patent may be obtained for five cents each, by addressing the "Commissioner of Patents, Washington, D. C."